United States Patent
Jonas et al.

(10) Patent No.: US 11,262,434 B2
(45) Date of Patent: Mar. 1, 2022

(54) ANTENNA ARRAY DESIGN AND PROCESSING TO ELIMINATE FALSE DETECTIONS IN A RADAR SYSTEM

(71) Applicant: GM Global Technology Operations LLC, Detroit, MI (US)

(72) Inventors: Amnon Jonas, Jerusalem (IL); Oded Bialer, Petah Tivak (IL)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 436 days.

(21) Appl. No.: 16/371,685

(22) Filed: Apr. 1, 2019

(65) Prior Publication Data

US 2020/0309899 A1    Oct. 1, 2020

(51) Int. Cl.
*G01S 7/03*         (2006.01)
*G01S 13/931*       (2020.01)

(52) U.S. Cl.
CPC ............ *G01S 7/032* (2013.01); *G01S 13/931* (2013.01); *G01S 2013/93271* (2020.01)

(58) Field of Classification Search
CPC .................................................... G01S 13/931
See application file for complete search history.

(56) References Cited

U.S. PATENT DOCUMENTS

| | | | | |
|---|---|---|---|---|
| 5,574,468 | A * | 11/1996 | Rose | G01S 3/043 342/424 |
| 5,675,343 | A * | 10/1997 | Champeau | H01Q 21/22 342/372 |
| 5,933,109 | A * | 8/1999 | Tohya | G01S 7/0235 342/175 |
| 8,289,203 | B2 * | 10/2012 | Culkin | H01Q 21/061 342/73 |
| 8,466,829 | B1 * | 6/2013 | Volman | G01S 3/48 342/147 |
| 8,665,137 | B2 * | 3/2014 | Wintermantel | G01S 7/032 342/59 |
| 8,717,224 | B2 * | 5/2014 | Jeong | G01S 13/931 342/70 |
| 8,779,969 | B2 * | 7/2014 | Shimizu | G01S 7/412 342/70 |
| 9,203,160 | B2 * | 12/2015 | Blech | H01Q 21/061 |
| 9,568,600 | B2 * | 2/2017 | Alland | G01S 7/03 |
| 9,869,762 | B1 * | 1/2018 | Alland | H01Q 21/28 |
| 10,371,796 | B2 * | 8/2019 | Kishigami | G01S 13/325 |
| 10,386,462 | B1 * | 8/2019 | Hong | G01S 13/878 |

(Continued)

*Primary Examiner* — Peter M Bythrow
(74) *Attorney, Agent, or Firm* — Cantor Colburn LLP

(57) ABSTRACT

A system and method to eliminate false detections in a radar system involve arranging an array of antenna elements into two or more sub-arrays with a spacing between adjacent ones of the antenna elements of one of the two or more sub-arrays being different than a spacing between adjacent ones of the antenna elements of at least one other of the two or more sub-arrays. The method includes receiving reflected signals at the two or more sub-arrays resulting from transmitting transmit signals from the antenna elements of the two or more sub-arrays, and processing the reflected signals to distinguish an actual angle from the radar system to an object that contributed to the reflected signals from ambiguous angles at which the false detections of the object are obtained. A location of the object is determined as a result of the processing.

20 Claims, 5 Drawing Sheets

(56) References Cited

U.S. PATENT DOCUMENTS

| | | | | |
|---|---|---|---|---|
| 10,446,938 B1* | 10/2019 | Wang | | H01Q 21/0006 |
| 10,573,959 B2* | 2/2020 | Alland | | G01S 13/86 |
| 10,615,516 B2* | 4/2020 | Kishigami | | G01S 13/22 |
| 10,629,998 B2* | 4/2020 | Lim | | G01S 13/931 |
| 10,677,918 B2* | 6/2020 | Ding | | H01Q 21/061 |
| 10,823,819 B2* | 11/2020 | Loesch | | G01S 13/931 |
| 10,871,562 B2* | 12/2020 | Trummer | | G01S 7/41 |
| 10,935,650 B2* | 3/2021 | Campbell | | G01S 13/90 |
| 10,965,038 B2* | 3/2021 | Kishigami | | G01S 13/003 |
| 11,047,971 B2* | 6/2021 | Bialer | | G01S 13/42 |
| 2003/0164791 A1* | 9/2003 | Shinoda | | H01Q 25/02 342/70 |
| 2006/0022866 A1* | 2/2006 | Walton | | H01Q 9/0407 342/194 |
| 2007/0008210 A1* | 1/2007 | Kibayashi | | G01S 13/723 342/70 |
| 2008/0291087 A1* | 11/2008 | Tietjen | | H01Q 21/065 342/372 |
| 2009/0085800 A1* | 4/2009 | Alland | | G01S 7/034 342/25 R |
| 2010/0033377 A1* | 2/2010 | Straatveit | | H01Q 21/29 342/378 |
| 2011/0074620 A1* | 3/2011 | Wintermantel | | H01Q 1/3233 342/70 |
| 2011/0140952 A1* | 6/2011 | Kemkemian | | G01S 13/426 342/146 |
| 2011/0298676 A1* | 12/2011 | Yanagihara | | H01Q 21/06 343/711 |
| 2012/0081247 A1* | 4/2012 | Kemkemian | | H01Q 3/2605 342/29 |
| 2014/0066757 A1* | 3/2014 | Chayat | | H01Q 21/064 600/430 |
| 2015/0057833 A1* | 2/2015 | Moriuchi | | G01S 13/06 701/1 |
| 2015/0204971 A1* | 7/2015 | Yoshimura | | B60W 30/00 342/70 |
| 2015/0253419 A1* | 9/2015 | Alland | | G01S 13/4463 342/385 |
| 2015/0253420 A1* | 9/2015 | Alland | | G01S 13/4454 342/156 |
| 2015/0285904 A1* | 10/2015 | Rao | | H01Q 25/00 342/146 |
| 2015/0355313 A1* | 12/2015 | Li | | G01S 13/02 342/195 |
| 2015/0355315 A1* | 12/2015 | Shimizu | | G01S 13/931 342/107 |
| 2016/0033632 A1* | 2/2016 | Searcy | | G01S 13/4454 342/153 |
| 2016/0172767 A1* | 6/2016 | Ray | | H01Q 21/22 343/893 |
| 2016/0238694 A1* | 8/2016 | Kishigami | | G01S 7/292 |
| 2016/0285172 A1* | 9/2016 | Kishigami | | G01S 13/22 |
| 2016/0365631 A1* | 12/2016 | Huang | | H01Q 21/12 |
| 2017/0082730 A1* | 3/2017 | Kishigami | | H01Q 21/061 |
| 2017/0139042 A1* | 5/2017 | Alenljung | | G01S 7/2921 |
| 2018/0038950 A1* | 2/2018 | Cornic | | G01S 13/931 |
| 2018/0088224 A1* | 3/2018 | Kishigami | | G01S 7/02 |
| 2018/0120427 A1* | 5/2018 | Cornic | | G01S 13/4463 |
| 2018/0348346 A1* | 12/2018 | Vallespi-Gonzalez | | G01S 7/4802 |
| 2019/0058262 A1* | 2/2019 | Maruyama | | G01S 7/2813 |
| 2019/0115670 A1* | 4/2019 | Kishigami | | G01S 13/003 |
| 2019/0137616 A1* | 5/2019 | Kishigami | | G01S 13/42 |
| 2019/0293753 A1* | 9/2019 | Iwasa | | G01S 7/03 |
| 2019/0324136 A1* | 10/2019 | Amadjikpe | | H04B 7/0434 |
| 2019/0386712 A1* | 12/2019 | Fang | | H04B 7/043 |
| 2020/0103515 A1* | 4/2020 | Kishigami | | G01S 13/343 |
| 2020/0225337 A1* | 7/2020 | Kishigami | | G01S 13/42 |
| 2020/0249344 A1* | 8/2020 | Heo | | G01S 7/032 |
| 2020/0393553 A1* | 12/2020 | Kishigami | | G01S 13/534 |
| 2021/0199757 A1* | 7/2021 | Oshima | | G01S 7/4914 |

\* cited by examiner

ANTENNA ARRAY DESIGN AND PROCESSING TO ELIMINATE FALSE DETECTIONS IN A RADAR SYSTEM

The subject disclosure relates to antenna array design and processing to eliminate false detections in a radar system.

Radar systems and other sensors are increasingly used in vehicles (e.g., automobiles, trucks, farm equipment, construction equipment, automated factories) to obtain information about the vehicle and its surroundings. A radar system may identify objects in the path of the vehicle, for example, and facilitate autonomous or semi-autonomous vehicle operation. A radar system having a wide field of view (i.e., wide aperture) facilitates obtaining more information about the surroundings of the vehicle. However, arranging antenna elements at no more than half-wavelength (½ λ) spacing over a wide aperture results in a relatively large number of antenna elements and correspondingly high complexity, power, and cost requirements. Yet, a sparser array of antenna elements over the same aperture width results in angle ambiguity that leads to false detections. Accordingly, it is desirable to provide an antenna array design and processing to eliminate false detections in a radar system.

SUMMARY

In one exemplary embodiment, a method of eliminating false detections in a radar system includes arranging an array of antenna elements into two or more sub-arrays with a spacing between adjacent ones of the antenna elements of one of the two or more sub-arrays being different than a spacing between adjacent ones of the antenna elements of at least one other of the two or more sub-arrays. The method also includes receiving reflected signals at the two or more sub-arrays resulting from transmitting transmit signals from the antenna elements of the two or more sub-arrays, and processing the reflected signals to distinguish an actual angle from the radar system to an object that contributed to the reflected signals from ambiguous angles at which the false detections of the object are obtained. A location of the object is determined as a result of the processing.

In addition to one or more of the features described herein, the arranging the array of the antenna elements includes the spacing between the adjacent ones of the antenna elements of the one of the two or more sub-arrays and the spacing between the adjacent ones of the antenna elements of the at least one other of the two or more sub-arrays are both greater than half a wavelength of the transmit signals.

In addition to one or more of the features described herein, the arranging the array of the antenna elements includes the one of the two or more sub-arrays including three of more of the antenna elements and the spacing between one pair of the adjacent ones of the three or more of the antenna elements is different than the spacing between another pair of the adjacent ones of the three or more of the antenna elements.

In addition to one or more of the features described herein, the arranging the array of the antenna elements includes the one of the two or more sub-arrays including three of more of the antenna elements and the spacing between all adjacent pairs of the three or more of the antenna elements is a same.

In addition to one or more of the features described herein, the processing the reflected signals includes generating clusters of detection points obtained with each of the two or more sub-arrays, each of the detection points having an associated angle and range.

In addition to one or more of the features described herein, the processing the reflected signals includes determining a detection overlap metric γ and a distribution uniformity metric δ for each of the clusters.

In addition to one or more of the features described herein, the determining the detection overlap metric γ includes computing:

$$\gamma = \frac{1}{N} \sum_{i=0}^{N-1} (\mu_i - \bar{\mu})^2,$$

where
N is a number of the two or more sub-arrays, $\mu_i$ is a mean of the detection points of an $i^{th}$ sub-array among the two or more sub-arrays, and $\bar{\mu}$ is a mean of all the detection points of all the sub-arrays, and a lower value of the detection overlap metric γ indicates a higher overlap among the detection points and a correspondence of the detection points to the object.

In addition to one or more of the features described herein, the determining the detection overlap metric γ includes computing:

$$\gamma = \sum_{\substack{i,j \\ i \neq j}} \frac{X_i \cap X_j}{X_i \cup X_j}, \text{ or}$$

$$\gamma = \min_{i,j} \frac{X_i \cap X_j}{X_i \cup X_j},$$

where
$X_i$ is a bounding box enclosing the detection points associated with an $i^{th}$ sub-array among the two or more sub-arrays and $X_j$ is a bounding box enclosing the detection points associated with any other of the two or more sub-arrays, and a higher value of the detection overlap metric γ indicates higher overlap among the detection points and a correspondence of the detection points to the object.

In addition to one or more of the features described herein, the determining the distribution uniformity metric δ includes computing:

$$\delta = \sum_{n=0}^{N-1} P_n \log(P_n), \text{ where}$$

$$P_n = \frac{S_n}{\sum\limits_{n=0}^{N-1} S_n},$$

and
$S_n$ is a number of the detection points of an $n^{th}$ sub-array among the two or more sub-arrays, and a higher value of the distribution uniformity metric δ indicates a higher likelihood of the number of detection points of the two or more sub-arrays being similar and a correspondence of the detection points to the object.

In addition to one or more of the features described herein, the processing the reflected signals includes generating a combined metric η from the detection overlap metric γ and the distribution uniformity metric δ for each of the clusters as:

$$\eta = \frac{C_1}{\gamma_1} + C_2\delta, \text{ or}$$

$$\eta = C_1\gamma_2 + C_2\delta,$$

where
$C_1$ and $C_2$ are scale factors, and the processing includes using a value of the combined metric $\eta$ exceeding a threshold as an indication that the detection points correspond with the object.

In another exemplary embodiment, a radar system in a vehicle includes an array of antenna elements arranged as two or more sub-arrays with a spacing between adjacent ones of the antenna elements of one of the two or more sub-arrays being different than a spacing between adjacent ones of the antenna elements of at least one other of the two or more sub-arrays. The radar system also includes a processor to receive reflected signals at the two or more sub-arrays resulting from transmitting transmit signals from the antenna elements of the two or more sub-arrays, to process the reflected signals to distinguish an actual angle from the radar system to an object that contributed to the reflected signals from ambiguous angles at which the false detections of the object are obtained, and to determine a location of the object as a result of the processing.

In addition to one or more of the features described herein, the spacing between the adjacent ones of the antenna elements of the one of the two or more sub-arrays and the spacing between the adjacent ones of the antenna elements of the at least one other of the two or more sub-arrays are both greater than half a wavelength of the transmit signals.

In addition to one or more of the features described herein, the one of the two or more sub-arrays includes three of more of the antenna elements and the spacing between one pair of the adjacent ones of the three or more of the antenna elements is different than the spacing between another pair of the adjacent ones of the three or more of the antenna elements, or the spacing between all adjacent pairs of the three or more of the antenna elements is a same.

In addition to one or more of the features described herein, the processor generates clusters of detection points obtained with each of the two or more sub-arrays, each of the detection points having an associated angle and range.

In addition to one or more of the features described herein, the processor determines a detection overlap metric $\gamma$ and a distribution uniformity metric for each of the clusters.

In addition to one or more of the features described herein, wherein the processor determines the detection overlap metric $\gamma$ by computing:

$$\gamma = \frac{1}{N}\sum_{i=0}^{N-1}(\mu_i - \bar{\mu})^2,$$

where
N is a number of the two or more sub-arrays, $\mu_i$ is a mean of the detection points of an $i^{th}$ sub-array among the two or more sub-arrays, and $\bar{\mu}$ t is a mean of all the detection points of all the sub-arrays, and a lower value of the detection overlap metric $\gamma$ indicates a higher overlap among the detection points and a correspondence of the detection points to the object.

In addition to one or more of the features described herein, the processor determines the detection overlap metric $\gamma$ by computing:

$$\gamma = \Sigma_{\substack{i,j \\ i \neq j}} \frac{X_i \cap X_j}{X_i \cup X_j}, \text{ or}$$

$$\gamma = \min_{i,j} \frac{X_i \cap X_j}{X_i \cup X_j},$$

where
$X_i$ is a bounding box enclosing the detection points associated with an $i^{th}$ sub-array among the two or more sub-arrays and $X_j$ is a bounding box enclosing the detection points associated with any other of the two or more sub-arrays, and a higher value of the detection overlap metric $\gamma$ indicates a higher overlap among the detection points and a correspondence of the detection points to the object.

In addition to one or more of the features described herein, the processor determines the distribution uniformity metric $\delta$ by computing:

$$\delta = \sum_{n=0}^{N-1} P_n \log(P_n), \text{ where}$$

$$P_n = \frac{S_n}{\sum_{n=0}^{N-1} S_n},$$

and
$S_n$ is a number of the detection points of an $n^{th}$ sub-array among the two or more sub-arrays, and a higher value of the distribution uniformity metric $\delta$ indicates a higher likelihood of the number of detection points of the two or more sub-arrays being similar and a correspondence of the detection points to the object.

In addition to one or more of the features described herein, the processor generates a combined metric $\eta$ from the detection overlap metric $\gamma$ and the distribution uniformity metric $\delta$ for each of the clusters as:

$$\eta = \frac{C_1}{\gamma_1} + C_2\delta, \text{ or}$$

$$\eta = C_1\gamma_2 + C_2\delta,$$

where
$C_1$ and $C_2$ are scale factors, and the processor is further configured to use a value of the combined metric $\eta$ exceeding a threshold as an indication that the detection points correspond with the object.

In addition to one or more of the features described herein, the processor is further configured to control an operation of the vehicle based on the location of the object.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
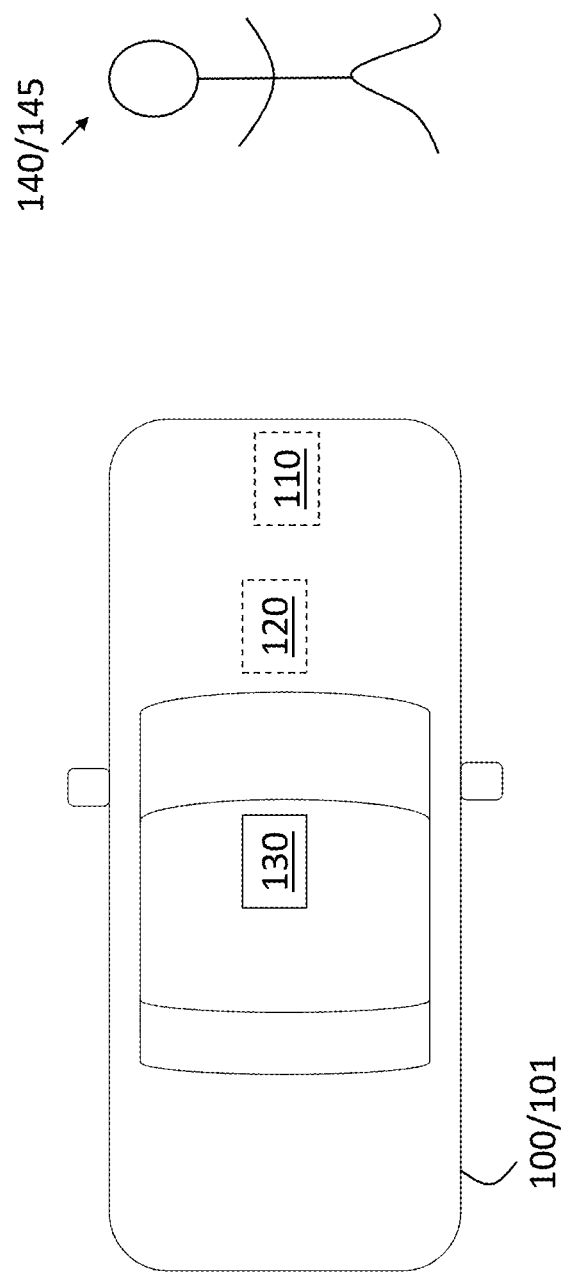
FIG. 1 is a block diagram of a vehicle with a radar system designed according to one or more embodiments.

The following description is merely exemplary in nature and is not intended to limit the present disclosure, its application or uses. It should be understood that throughout the drawings, corresponding reference numerals indicate like or corresponding parts and features.

As previously noted, a wide aperture of antenna elements in a radar system facilitates obtaining information from a wide field of view. However, a dense array of antenna elements over that width with the requisite half-wavelength spacing between them is costly in terms of components and complexity. At the same time, a more sparse array of antenna elements, which are spaced apart by more than a half-wavelength, results in decreased angular resolution and false detections due to ambiguity in determining the angle of arrival of reflections. Embodiments of the systems and methods detailed herein relate to an antenna array design and processing to eliminate false detections in a radar system. The antenna array is designed as a series of subarrays with different adjacent-element spacing. This results in false detections (i.e., ghost objects) by each of the subarrays being clustered rather than overlapping. The processing involves recognizing the ghost objects based on the clustering so that real targets may be identified. Based on the array design and processing according to one or more embodiments, the advantages of a wide aperture may be obtained without the costs of a dense array.

In accordance with an exemplary embodiment, FIG. 1 is a block diagram of a vehicle 100 with a radar system 110. The exemplary vehicle 100 is an automobile 101. The vehicle 100 may include one or more other sensors 130 (e.g., camera, lidar system) in addition to the radar system 110. The sensor 130 may be used separately or in conjunction with the radar system 110 to detect objects 140 such as the pedestrian 145 shown in FIG. 1. The vehicle 100 also includes a controller 120. Processing of data obtained by the radar system 110 may be performed within the radar system 110 or by the controller 120 using processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality. A combination of the radar system 110 and controller 120 may be used to process the data. The controller 120 may control operation of the vehicle 100 (e.g., autonomous driving, semi-autonomous driving such as collision avoidance, automatic braking, adaptive cruise control) based on the detection of objects 140. The radar system 110 is further detailed with reference to FIG. 2.

Figure 2:
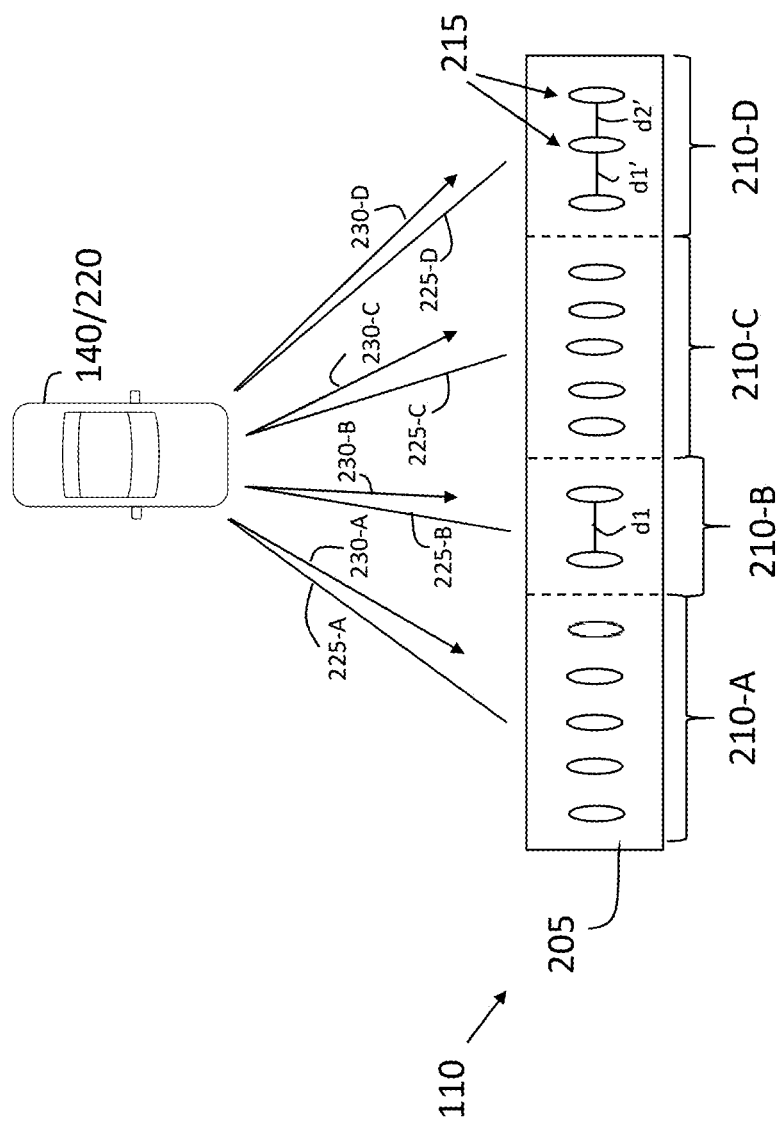
FIG. 2 shows an exemplary antenna array design to eliminate false detections in a radar system according to one or more embodiments.

FIG. 2 shows an exemplary antenna array design to eliminate false detections in a radar system 110 according to one or more embodiments. The exemplary antenna array 205 shown in FIG. 2 includes four antenna sub-arrays 210-A, 210-B, 210-C, 210-D (generally referred to as 210) that transmit respective transmit signals 225-A, 225-B, 225-C, 225-D (generally referred to as 225) and receive respective reflection signals 230-A, 230-B, 230-C, 230-D (generally referred to as 230). The antenna array 205 is part of the radar system 110 in the vehicle 100 shown in FIG. 1. The exemplary object 140 reflecting the transmit signals 225 in FIG. 2 is a car 220.

Each antenna sub-array 210 can have one or more antenna elements 215. The spacing between adjacent antenna elements 215 of the antenna array 205 is greater than a half-wavelength distance, which is necessary to avoid angular ambiguity. The spacing among antenna elements 215 of a given antenna sub-array 210 need not be uniform. For example, the spacing d1' between the first two antenna elements 215 of antenna sub-array 210-D may be different than the spacing d2' between the second and third antenna elements 215 of the antenna sub-array 210-D.

According to one or more embodiments, the spacing among the antenna elements 215 of a given antenna sub-array 210 is different than the spacing among the antenna elements 215 of at least one other antenna sub-array 210 in the antenna array 205. That is, at least two of the antenna sub-arrays 210 have different spacing among their antenna elements 215. For example, the spacing d1 between the two antenna elements 215 of the antenna sub-array 210-B is different than either of the spacings d1', d2' between adjacent antenna elements 215 of the antenna array 210-D. In the exemplary antenna array 205 shown in FIG. 2, the spacing d1 is also different than spacings among antenna elements 215 of the antenna sub-array 210-A which are different than spacings among antenna elements 215 of the antenna sub-array 210-C. The result of the spacing according to one or more embodiments (i.e., its application to eliminating false detections) is discussed with reference to FIG. 3.

Figure 3:
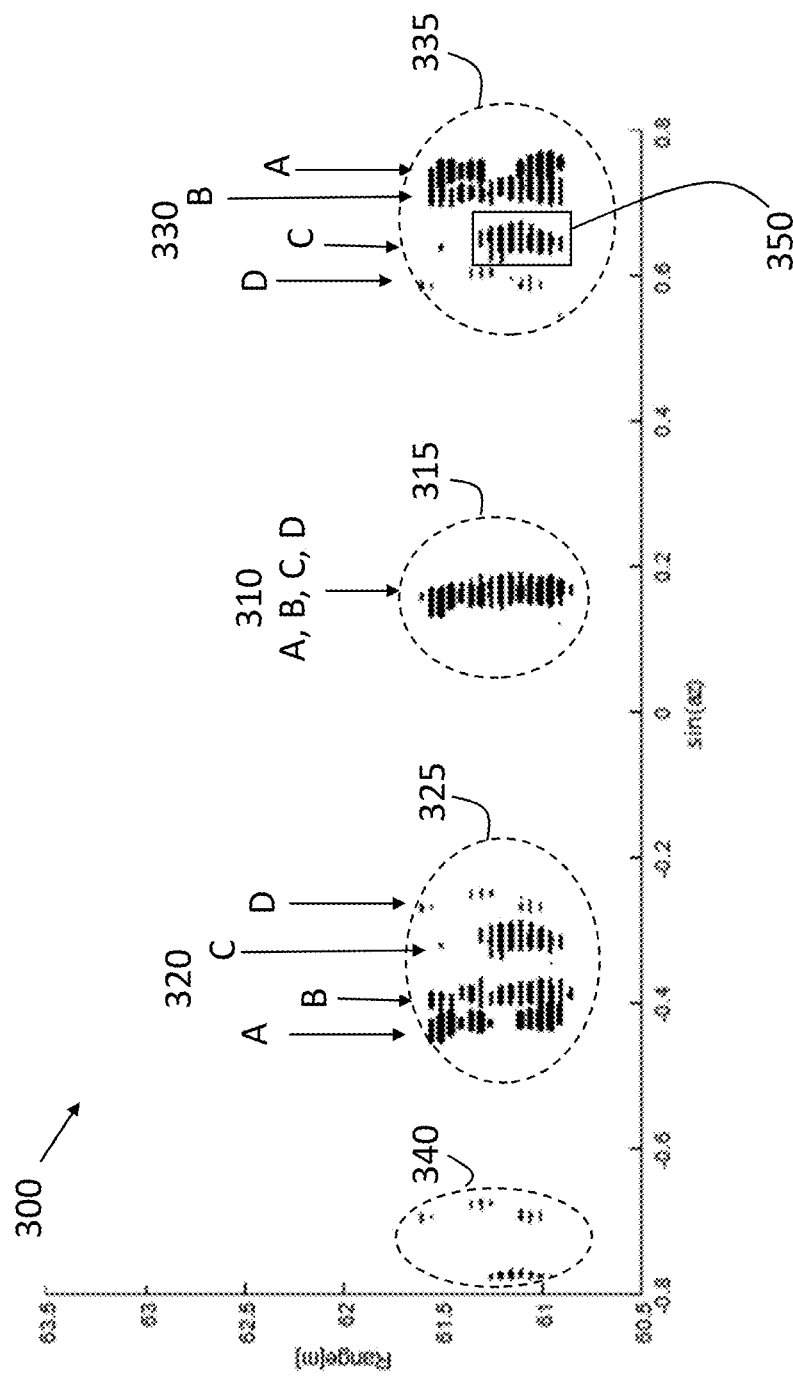
FIG. 3 shows detections that result from using an exemplary antenna array design to eliminate false detections in a radar system according to one or more embodiments.

FIG. 3 shows detections 300 that result from using an exemplary antenna array design to eliminate false detections in a radar system according to one or more embodiments. The detections 300 are made up of point cloud detection points. The detections 300 resulting from reflection signals 230 from the car 220, according to the scenario shown in FIG. 2, are indicated as an azimuth (az) angle value, sin(az), versus range in meters (m). FIG. 3 shows that the detections 310 of the real car 220 by all four antenna sub-arrays 210 (indicated as A, B, C, and D) are grouped in one position. That is, the angle values obtained with each of the antenna sub-arrays 210 overlap. However, the detections 320, 330 of ghost objects (i.e., false detections of the angle of arrival of reflection signals 230 from the car 220) are spread over a set of angle values associated with each of the sub-arrays 210 (indicated as A, B, C, D). The clusters 315, 325, 335, and 340 are discussed with reference to FIG. 5, as is the exemplary bounding box 350. As also further discussed with reference to FIG. 5, the difference in the spread of the angle values obtained with the antenna sub-arrays 210 for the detections 310 of the true object 140 (e.g., real car 220) and the detections 320, 330 of the ghost objects is used to identify and locate the true object 140 (i.e., eliminate the false detections).

Figure 4:
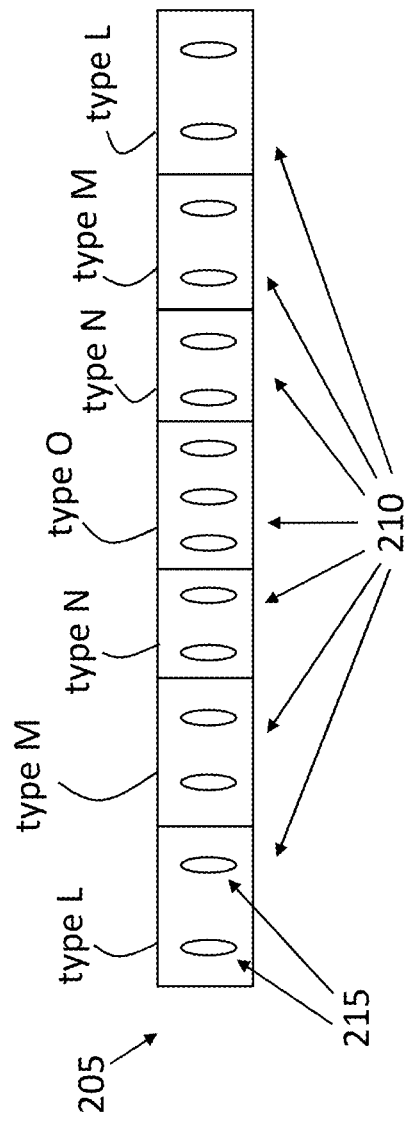
FIG. 4 is an exemplary antenna array design to eliminate false detections in a radar system according to one or more embodiments.

FIG. 4 is an exemplary antenna array design to eliminate false detections in a radar system 110 according to one or more embodiments. The antenna array 205 includes seven antenna sub-arrays 210. Each antenna sub-array 210 is labeled with a type that corresponds with the spacing between antenna elements 215 of the antenna sub-array 210. For example, the two antenna elements 215 in the antenna sub-array 210 of type L may be separated by 2.32λ while the first two antenna elements 215 of the antenna sub-array 210 of type O are separated by 1.724λ and the second and third antenna elements 215 of the antenna sub-array 210 of type O are separated by 1.82λ. As FIG. 4 indicates, the same type (i.e., spacing among antenna elements 215) is repeated in the exemplary antenna array 205. For example, the antenna array 205 includes two antenna sub-arrays 210 of type L, two of type M, and two of type N.

As previously noted, at least two sub-arrays 210 must be of different types (i.e., include different spacing among antenna elements 215) within an antenna array 205 according to one or more embodiments. In the exemplary antenna array 205 shown in FIG. 4, four different types of antenna sub-arrays 210 are used, but three of those types are repeated. As shown in FIG. 3 and further discussed with reference to FIG. 5, having at least two different types (i.e., spacings) of antenna sub-arrays 210 within the antenna array 205 ensures that the angle of ambiguity (i.e., the angle value associated with the false detection or ghost object) is not overlapping based on detections resulting from the two different types of antenna sub-arrays 210. This makes the false detections distinguishable from the detection of the actual object 140.

Figure 5:
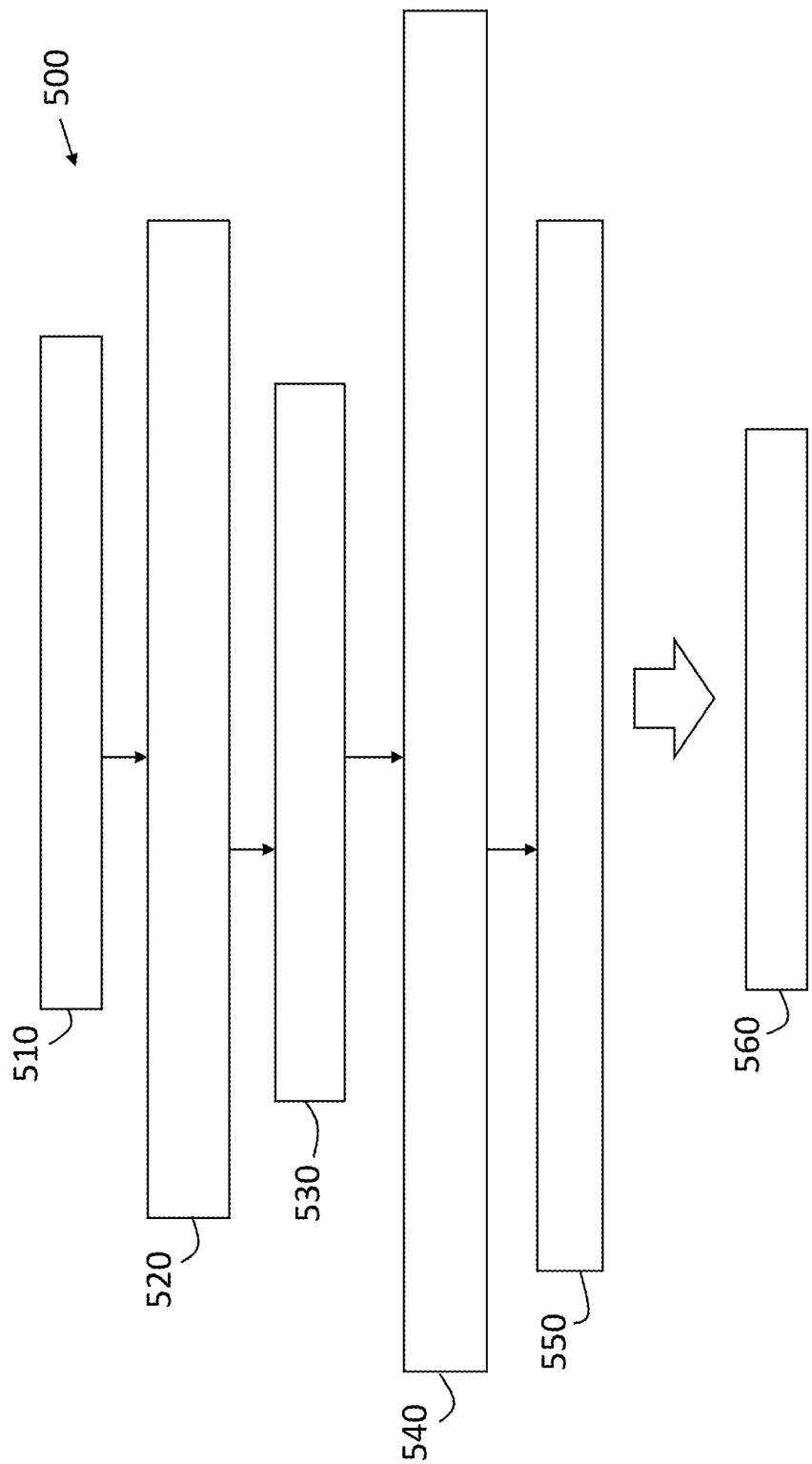
FIG. 5 is a process flow of a method of implementing antenna array design and processing to eliminate false detections in a radar system according to one or more embodiments.

FIG. 5 is a process flow 500 of a method of implementing antenna array design and processing to eliminate false detections in a radar system 110 according to one or more embodiments. At block 510, arranging antenna elements 215 in sub-arrays 210 includes at least two of the sub-arrays 210 of the antenna array 205 having different spacing among their antenna elements 215. Specifically, the spacing among antenna elements 215 of one antenna sub-array 210 must not be the same and must additionally not be an integer multiple of the spacing among antenna elements 215 of at least one other antenna sub-array 210. As FIGS. 2 and 4 indicate, the spacing among antenna elements 215 within the same antenna sub-array 210 need not be the same. As shown in FIG. 4, exemplary antenna array designs may include repetitions of types of antenna sub-arrays 210 as long as at least two of the antenna sub-arrays 210 are different. Each of the antenna sub-arrays 210 is a linear array.

At block 520, the process flow 500 includes processing reflection signals 230 of each antenna sub-array 210 independently. This results in detections 300 like those shown in FIG. 3. At block 530, implementing clustering on the detections 300 refers to using a clustering algorithm that groups points within a defined proximity. Thus, in the exemplary case shown in FIG. 3, the detections 310 of the real car 220 would be grouped into one cluster 325, the detections 320 of ghost object (i.e., one set of false detections) would be grouped into cluster 325, and the detections 330 of another ghost object would be grouped into another cluster 335. FIG. 3 also shows another cluster 340 of detection points associated with a ghost object.

The processes at block 540 are performed for each of the clusters 315, 325, 335, 340. Calculating a detection overlap metric γ and a distribution uniformity metric δ for each cluster 315, 325, 335, 340, at block 540, may also include determining a combined metric η. The metrics determined at block 540 are used in identifying and eliminating clusters 325, 335, 340 that are associated with false detections, at block 550. The cluster 315 of true detections 310, which provides the location of a true object 140 (e.g., car 220), may be used to control vehicle operation, at block 560. The metrics determined at block 540 are detailed.

The detection overlap metric γ may be determined according to different embodiments. According to an exemplary embodiment, the detection overlap metric γ may be determined as a variance from the mean of all detection positions in the given cluster 315, 325, 335, 340:

$$\gamma = \frac{1}{N}\sum_{i=0}^{N-1}(\mu_i - \overline{\mu})^2 \qquad [\text{EQ. 1}]$$

In EQ. 1, N is the number of antenna sub-arrays 210, $\mu_i$ is the mean of the detection points of the $i^{th}$ antenna sub-array 210 in the given cluster 315, 325, 335, 340, and $\overline{\mu}$ is the mean of all the detection points of all the antenna sub-arrays 210 in the given cluster 315, 325, 335, 340. A lower value of the detection overlap metric γ indicates a large overlap in the detection points and, thus, a likely real object 140 rather than false detections.

The detection overlap metric γ, according to another exemplary embodiment, may be determined as an intersection over union (IoU) metric between bounding boxes 350 of detection points of antenna sub-arrays 210 in a given cluster 315, 325, 335, 340. The IoU metric may be determined in one of two ways:

$$\gamma = \Sigma_{\substack{i,j \\ i \neq j}} \frac{X_i \cap X_j}{X_i \cup X_j} \qquad [\text{EQ. 2}]$$

$$\gamma = \min_{i,j} \frac{X_i \cap X_j}{X_i \cup X_j} \qquad [\text{EQ. 3}]$$

In EQS. 2 and 3, $X_i$ is the bounding box 350 around the detection points associated with the $i^{th}$ antenna sub-array 210 and $X_j$ is the bounding box 350 around the detection points associated with any other of the antenna sub-arrays 210. As shown in FIG. 3, a bounding box 350 is a shape (e.g., rectangle) that encloses a set of detection points. According to the present embodiment, a higher value of the detection overlap metric γ indicates a large overlap in the detection points and, thus, a likely real object 140 rather than false detections.

The distribution uniformity metric δ represents the entropy of the distribution of detection points of the different sub-arrays 210 in a cluster 315, 325, 335, 340. A higher entropy means that the number of detection points of the different sub-arrays 210 is similar and, therefore, likely to be associated with a real object 140 rather than a false detection. The distribution uniformity metric δ is given by:

$$\delta = \Sigma_{n=0}^{N-1} P_n \log(P_n) \qquad [\text{EQ. 4}]$$

In EQ. 4, the probability of detection points from an $n^{th}$ type antenna sub-array 210 is given by:

$$P_n = \frac{S_n}{\sum_{n=0}^{N-1} S_n} \qquad [\text{EQ. 5}]$$

In EQ. 5, $S_n$ is the number of detection points of the $n^{th}$ antenna sub-array 210. A higher value of the distribution uniformity metric δ indicates a similarity in the number of detection points among the antenna sub-arrays and, thus, a likelihood of the detection points relating to a real object 140 (e.g., car 220).

The detection overlap metric γ and distribution uniformity metric may be combined to generate a combined metric η as:

$$\eta = \frac{C_1}{\gamma_1} + C_2\delta \quad [\text{EQ. 6}]$$

Alternately, the combined metric η may be determined as:

$$\eta = C_1\gamma_2 + C_2\delta \quad [\text{EQ. 7}]$$

In EQS. 6 and 7, $C_1$ and $C_2$ are factors that scale the detection overlap metric γ and the distribution uniformity metric δ and weight the proportion between them. The cluster 315 associated with a real object 140 is detected when η exceeds a threshold value. The threshold value may be set to balance high detection probability for the real cluster 315 and low probability of false detections.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A method of eliminating false detections in a radar system, the method comprising:
    arranging an array of antenna elements into two or more sub-arrays with a spacing between adjacent ones of the antenna elements of one of the two or more sub-arrays being different than a spacing between adjacent ones of the antenna elements of at least one other of the two or more sub-arrays;
    receiving reflected signals at the two or more sub-arrays resulting from transmitting transmit signals from the antenna elements of the two or more sub-arrays;
    processing the reflected signals to distinguish an actual angle from the radar system to an object that contributed to the reflected signals from ambiguous angles at which the false detections of the object are obtained; and
    determining a location of the object as a result of the processing.

2. The method according to claim 1, wherein the arranging the array of the antenna elements includes the spacing between the adjacent ones of the antenna elements of the one of the two or more sub-arrays and the spacing between the adjacent ones of the antenna elements of the at least one other of the two or more sub-arrays are both greater than half a wavelength of the transmit signals.

3. The method according to claim 1, wherein the arranging the array of the antenna elements includes the one of the two or more sub-arrays including three or more of the antenna elements and the spacing between one pair of the adjacent ones of the three or more of the antenna elements is different than the spacing between another pair of the adjacent ones of the three or more of the antenna elements.

4. The method according to claim 1, wherein the arranging the array of the antenna elements includes the one of the two or more sub-arrays including three or more of the antenna elements and the spacing between all adjacent pairs of the three or more of the antenna elements is a same.

5. The method according to claim 1, wherein the processing the reflected signals includes generating clusters of detection points obtained with each of the two or more sub-arrays, each of the detection points having an associated angle and range.

6. The method according to claim 5, wherein the processing the reflected signals includes determining a detection overlap metric γ and a distribution uniformity metric δ for each of the clusters.

7. The method according to claim 6, wherein the determining the detection overlap metric γ includes computing:

$$\gamma = \frac{1}{N}\sum_{i=0}^{N-1}(\mu_i - \overline{\mu})^2,$$

where
    N is a number of the two or more sub-arrays, $\mu_i$ is a mean of the detection points of an $i^{th}$ sub-array among the two or more sub-arrays, and $\overline{\mu}_i$ is a mean of all the detection points of all the sub-arrays, and a decreasing value of the detection overlap metric γ corresponds with an increasing overlap among the detection points and a correspondence of the detection points to the object.

8. The method according to claim 6, wherein the determining the detection overlap metric γ includes computing:

$$\gamma = \Sigma_{\substack{i,j \\ i \neq j}}\frac{X_i \cap X_j}{X_i \cup X_j}, \text{ or}$$

$$\gamma = \min_{i,j}\frac{X_i \cap X_j}{X_i \cup X_j},$$

where
    $X_i$ is a bounding box enclosing the detection points associated with an $i^{th}$ sub-array among the two or more sub-arrays and $X_j$ is a bounding box enclosing the detection points associated with any other of the two or more sub-arrays, and an increasing value of the detection overlap metric γ indicates corresponds with an increasing overlap among the detection points and a correspondence of the detection points to the object.

9. The method according to claim 6, wherein the determining the distribution uniformity metric δ includes computing:

$$\delta = \sum_{n=0}^{N-1}P_n\log(P_n), \text{ where}$$

$$P_n = \frac{S_n}{\sum_{n=0}^{N-1}S_n},$$

and
    $S_n$ is a number of the detection points of an $n^{th}$ sub-array among the two or more sub-arrays, and an increasing value of the distribution uniformity metric δ corresponds with an increasing likelihood of the number of detection points of the two or more sub-arrays being similar and a correspondence of the detection points to the object.

10. The method according to claim 6, wherein the processing the reflected signals includes generating a combined metric η from the detection overlap metric γ and the distribution uniformity metric δ for each of the clusters as:

$$\eta = \frac{C_1}{\gamma_1} + C_2\delta, \text{ or}$$

$$\eta = C_1\gamma_2 + C_2\delta,$$

where
$C_1$ and $C_2$ are scale factors, and the processing includes using a value of the combined metric η exceeding a threshold as an indication that the detection points correspond with the object.

11. A radar system in a vehicle, comprising:
an array of antenna elements arranged as two or more sub-arrays with a spacing between adjacent ones of the antenna elements of one of the two or more sub-arrays being different than a spacing between adjacent ones of the antenna elements of at least one other of the two or more sub-arrays; and
a processor configured to receive reflected signals at the two or more sub-arrays resulting from transmitting transmit signals from the antenna elements of the two or more sub-arrays, to process the reflected signals to distinguish an actual angle from the radar system to an object that contributed to the reflected signals from ambiguous angles at which the false detections of the object are obtained, and to determine a location of the object as a result of the processing.

12. The radar system according to claim 11, wherein the spacing between the adjacent ones of the antenna elements of the one of the two or more sub-arrays and the spacing between the adjacent ones of the antenna elements of the at least one other of the two or more sub-arrays are both greater than half a wavelength of the transmit signals.

13. The radar system according to claim 11, wherein the one of the two or more sub-arrays includes three or more of the antenna elements and the spacing between one pair of the adjacent ones of the three or more of the antenna elements is different than the spacing between another pair of the adjacent ones of the three or more of the antenna elements, or the spacing between all adjacent pairs of the three or more of the antenna elements is a same.

14. The radar system according to claim 11, wherein the processor is further configured to generate clusters of detection points obtained with each of the two or more sub-arrays, each of the detection points having an associated angle and range.

15. The radar system according to claim 14, wherein the processor is configured to determine a detection overlap metric γ and a distribution uniformity metric δ for each of the clusters.

16. The radar system according to claim 15, wherein the processor is configured to determine the detection overlap metric γ by computing:

$$\gamma = \frac{1}{N}\sum_{i=0}^{N-1}(\mu_i - \bar{\mu})^2,$$

where
N is a number of the two or more sub-arrays, $\mu_i$ is a mean of the detection points of an $i^{th}$ sub-array among the two or more sub-arrays, and $\bar{\mu}_i$ is a mean of all the detection points of all the sub-arrays, and a decreasing value of the detection overlap metric γ corresponds with an increasing overlap among the detection points and a correspondence of the detection points to the object.

17. The radar system according to claim 15, wherein the processor is configured to determine the detection overlap metric γ by computing:

$$\gamma = \sum_{\substack{i,j \\ i\neq j}} \frac{X_i \cap X_j}{X_i \cup X_j}, \text{ or}$$

$$\gamma = \min_{i,j} \frac{X_i \cap X_j}{X_i \cup X_j},$$

where
$X_i$ is a bounding box enclosing the detection points associated with an $i^{th}$ sub-array among the two or more sub-arrays and $X_j$ is a bounding box enclosing the detection points associated with any other of the two or more sub-arrays, and an increasing value of the detection overlap metric γ corresponds with an increasing overlap among the detection points and a correspondence of the detection points to the object.

18. The radar system according to claim 15, wherein the processor is configured to determine the distribution uniformity metric δ by computing:

$$\delta = \sum_{n=0}^{N-1} P_n \log(P_n), \text{ where}$$

$$P_n = \frac{S_n}{\sum_{n=0}^{N-1} S_n},$$

and
$S_n$ is a number of the detection points of an $n^{th}$ sub-array among the two or more sub-arrays, and an increasing value of the distribution uniformity metric δ corresponds with an increasing likelihood of the number of detection points of the two or more sub-arrays being similar and a correspondence of the detection points to the object.

19. The radar system according to claim 15, wherein the processor is configured to generate a combined metric η from the detection overlap metric γ and the distribution uniformity metric δ for each of the clusters as:

$$\eta = \frac{C_1}{\gamma_1} + C_2\delta, \text{ or}$$

$$\eta = C_1\gamma_2 + C_2\delta,$$

where
$C_1$ and $C_2$ are scale factors, and the processor is further configured to use a value of the combined metric η exceeding a threshold as an indication that the detection points correspond with the object.

20. The radar system according to claim 11, wherein the processor is further configured to control an operation of the vehicle based on the location of the object.

\* \* \* \* \*